United States Patent [19]
Ritchey

[11] Patent Number: 5,840,228
[45] Date of Patent: *Nov. 24, 1998

[54] METHOD OF CREATING INDICIA ON A MOLDED ARTICLE

[76] Inventor: Eugene B. Ritchey, 13821 Sable Blvd., Brighton, Colo. 80601

[*] Notice: The term of this patent shall not extend beyond the expiration date of Pat. No. 5,492,397.

[21] Appl. No.: 852,724

[22] Filed: May 7, 1997

Related U.S. Application Data

[63] Continuation-in-part of Ser. No. 727,361, Oct. 8, 1996.

[51] Int. Cl.⁶ .................................................. B29C 45/16
[52] U.S. Cl. ...................... 264/132; 264/255; 264/328.8; 264/162
[58] Field of Search ..................................... 264/255, 513, 264/537, 129, 132, 162, 328.8, 296

[56] References Cited

U.S. PATENT DOCUMENTS

| | | | |
|---|---|---|---|
| 3,680,763 | 8/1972 | Ludder | 264/132 |
| 3,894,823 | 7/1975 | Hanning | 425/130 |
| 4,014,966 | 3/1977 | Hanning | 264/45.1 |
| 4,104,353 | 8/1978 | Monnet | 264/255 |
| 4,174,413 | 11/1979 | Yasuike et al. | 428/35 |
| 4,525,134 | 6/1985 | McHenry et al. | 425/130 |
| 4,526,821 | 7/1985 | McHenry et al. | 428/35 |
| 4,717,324 | 1/1988 | Schad et al. | 425/130 |
| 4,781,954 | 11/1988 | Krishnakumar et al. | 264/513 |
| 4,851,062 | 7/1989 | Tartaglione | 264/132 |
| 4,990,301 | 2/1991 | Krishnakumar et al. | 264/513 |
| 5,032,341 | 7/1991 | Krishnakuman et al. | 264/255 |
| 5,049,345 | 9/1991 | Collette et al. | 264/255 |
| 5,141,695 | 8/1992 | Nakamura | 264/255 |
| 5,246,646 | 9/1993 | Baxi | 264/40.3 |
| 5,254,306 | 10/1993 | Inada et al. | 264/572 |
| 5,374,178 | 12/1994 | Nakayama | 425/130 |
| 5,595,799 | 1/1997 | Beck et al. | 264/513 |

*Primary Examiner*—Angela Ortiz
*Attorney, Agent, or Firm*—Fields and Johnson, P.C.

[57] ABSTRACT

An improved method of injection molding is characterized by an annular flow of resin materials into a mold cavity to produce a molded article. The innermost resin material within the annular stream of material flows in an inside-out pattern and forms the cap layer of the molded article. The inner core material of the molded article concentrically surrounds the cap material during the injection process except for the leading edge of the inner core material which is preceded by the cap material into the mold cavity. The molded article may have two or more layers created by the process wherein each of the layers can be controlled in terms of their thickness and content within the molded article. If more than two resin materials are provided in a concentric arrangement during flow, these additional materials can either flow in a laminar flow pattern within the mold, or can flow in an inside-out flow pattern similar to the cap material, each type of additional material flow creating an additional layer of the molded article. Indicia may be formed on the molded article by creating recessed or protruding portions on the molded article and then applying a highlighter such as a marker, grinder or hot stamp.

5 Claims, 7 Drawing Sheets

Fig_1
PRIOR ART

Fig_2
PRIOR ART

Fig_3
PRIOR ART

Fig_4
PRIOR ART

Fig_8

Fig_9

Fig_9A

Fig_10

Fig_11

Fig_12

Fig_13

Fig_14

Fig_16

Fig_17

Fig_18

Fig_19

Fig_20

Fig_21

Fig_22

Fig_23

Fig_24

Fig_25

Fig_26

METHOD OF CREATING INDICIA ON A MOLDED ARTICLE

TECHNICAL FIELD

This application is a continuation-in-part of U.S. Ser. No. 08/727,361, filed Oct. 8, 1996 and entitled "Improved Method of Injection Molding."

This invention relates to an improved method of injection molding resulting in a method of creating indicia on multi-layered articles.

BACKGROUND ART

The development of injection molding has enabled manufacturers to create articles having complex shapes and articles having multi-layers which provide the articles with certain desirable characteristics. For example, in creating an article through injection molding, it may be desirable to have a cap or skin layer which has certain properties while the inner core layer may have other desirable properties.

One example of multi-layered articles created by injection molding is described in U.S. Pat. No. 4,174,413 to Yasuike, et al. This reference discloses multi-layered molded articles having in their cross-section a triple-layered structure consisting of two surface layers and a core layer interposed between the surface layers. The triple layer structure is injection molded in a single shot from two kinds of thermoplastic synthetic resins which are formed into the surface and core layers. The primary method upon which the molded article is formed is through the laminar flow of the thermoplastic synthetics resins in the mold.

Another example of injection molding is shown in U.S. Pat. No. 4,717,314 to Chaud, et al. Specifically, an apparatus is disclosed for injecting a plurality of thermoplastic materials to form an article having a layered wall structure. The thermoplastic materials have different optimum processing temperatures that are maintained in flow paths individual to each material from its source to a mold cavity. The injection process is achieved by filling the mold cavity through a series of separate shots or injections of the materials making up the article.

U.S. Pat. No. 4,104,353 to Monnet discloses a method and a machine for production of articles by injection molding wherein the articles include composite portions formed by introduction of one of at least two materials of different compositions inside the other. The method includes the steps of injecting a first material into at least two different zones of a mold; injecting a second material into the first material at said zones, the second material pushing the first material against the walls of the mold; and creating in the junction plane of the masses of the first material a leakage of a predetermined quantity of first material. The leakage permits the joining and mixing of the two masses of the second material at the level of the junction of the masses of the first material.

U.S. Pat. No. 5,374,178 to Nakayama discloses an injection molding machine, wherein a skin layer resin is injected from a first hot runner into a cavity in a mold, and then a resin passage between the first hot runner and the cavity is closed, thereby finishing the injecting of the skin layer resin. A core layer of resin is then injected from a second hot runner into the cavity at a predetermined time between the start and the end of the injection of the skin layer thereby creating a sandwich-molded product void of any hesitation marks.

U.S. Pat. Nos. 3,894,823 and 4,014,966 to Hanning both disclose an apparatus for the injection molding of bodies of synthetic resins including an outer skin material and a core material. According to the method effected by the apparatus of this invention, an initial amount of skin material is introduced into an injection tube which is then followed by core material introduced into the injection tube. Simultaneous injection of the skin and core material occurs during a substantial portion of the injection molding process.

U.S. Pat. No. 2,254,306 to Inada discloses a method for making a double layer molded product characterized by a sandwich construction. Within a mold surrounding the product is provided a dam adjacent to a gate of the mold. The dam projects in a direction transverse to that in which the injection material is introduced wherein the core or skin thicknesses of the molded product can be made uniform.

U.S. Pat. No. 5,246,646 to Baxi discloses a method and apparatus for making a plastic injection molded part with a smooth surface or skin and a hollow core wherein a thermoplastic material is injected as a molten stream into the mold cavity through a screw bushing fixed in the mold. Simultaneously, an unmeasured quantity of inert gas is introduced through an adapter into the molten stream at the screw bushing at a pressure sufficient to penetrate the thermoplastic material to form a gas cavity in the molten material in the mold. The use of gas pressure within the mold results in production of a uniform layer of cap material.

U.S. Pat. Nos. 4,525,134 and 4,526,821 to McHenry, et al., each disclose an apparatus for making a rigid container by injection molding a product having plural layers of polymers. Control during injection is exercised over each of the plural polymers so as to produce uninterrupted layers extending throughout the walls of the product and to ensure that the inner layers are completely encapsulated within the outer layers. According to the method effected by the apparatus of this invention, a laminar flow of each of the polymer materials occurs throughout the injection molding process.

While each of the foregoing inventions may be adequate for their intended purposes, none disclose a method of injection molding cap and core materials which are simultaneously introduced into a mold in an annular stream and wherein the cap material forming the cap or skin layer is the innermost material within the annular stream. The advantages of such an annular stream or concentric arrangement of material introduced into a mold will be discussed below in conjunction with the invention disclosed herein.

SUMMARY OF THE INVENTION

In accordance with the present invention, an improved method of injection molding is provided to create molded articles having a plurality of layers which may arranged within the molded article in a desired manner. The result of this improved method of injection molding, in one particular application, is the ability to form precise recesses or protruding structures on a molded article for purposes of creating indicia on the molded article. The method of this invention begins with the provision of at least two thermoplastic resins or other material capable of being injected into a mold wherein the materials are arranged in an annular stream or concentric arrangement. More specifically, the material which becomes the cap or skin layer of the molded article resides as the innermost material within the annular stream. Surrounding the cap or skin material within the annular stream is the material which becomes the core of the molded article.

As the annular stream of resins is introduced into a mold cavity, the cap or skin material initially makes contact with the inner surface of the mold. As injection continues, the concentric arrangement of the resin materials is maintained such that the cap material remains in the annular stream within the core material, yet also forms the cap layer of the molded article by flowing beyond the leading flow edge of the core material. The continuing annular stream of the cap and core material within the mold enables the production of a substantially uniform cap layer which bounds the core layer. The arrangement of the annular stream within the mold results in the inner core material placing an even and controllable pressure along each segment of the cap material as it is deposited along the inner surface of the mold. The even and controllable pressure placed on the cap material is one major factor which enables the formation of a cap material of a desired thickness. The flow of the cap material can be described as an inside-out flow pattern. Depending upon the desired properties of the article to be molded, the flow of the cap material can be terminated at the appropriate time to ensure that the distal end of the mold also has a uniform cap layer. On the other hand, if complete uniformity of the cap layer is not required at the distal end of the mold, then the annular flow of cap and core material can continue throughout the injection molding process until the mold cavity is filled.

It may be desirable to create a molded article which includes more than two component parts. Accordingly, an annular stream of material can be provided with more than two distinct layers. In this circumstance, additional resin materials would be introduced into the mold wherein the designated cap material would be surrounded concentrically by the additional resin materials, each in their own concentric arrangement. Depending upon the temperature, flow rate, and viscosity of the additional resin materials provided, one or more of these additional resin materials can be controlled to flow in the same pattern as the cap material; that is, the inside-out fashion, or the additional resin materials can be simply introduced in a laminar flow whereby only the cap material flows in the inside-out manner.

A number of variables can be manipulated to control the thickness and arrangement of each of the layered materials making up the molded article. One such variable is the temperature of each of the resin materials introduced into the mold. In most circumstances, a resin material having a higher temperature will flow at a higher rate into the mold cavity. Accordingly, the temperatures of each of the resin materials can be varied to achieve the desired flow of each of the resin materials into the mold. For example, if it were desired to have a relatively thick cap layer, the cap layer could be provided at a high enough temperature so that its flow rate is increased to allow more of the cap material to be deposited upon the inner surface of the mold.

Another variable which can control the composition of the molded article is the particular viscosities of each of the resin materials. Increasing the viscosity of the resin materials will typically cause the resin materials to flow at a lower rate. Accordingly, increasing or decreasing the viscosities of the resin materials can directly correspond to the amount of each of the materials which can be found in the molded article.

Another variable which closely relates to the individual temperatures of the resin materials is the temperature gradient of the resin materials as they reside in their annular stream. By controlling the temperature gradient of the annular stream as a whole, the content of the molded article may be controlled in terms of the constituent layers making up the molded article.

Another variable affecting the content of the molded article is the flow rate of the resin materials into the mold as determined by a preset injection pressure. By simply increasing or decreasing the flow rates of the resin materials apart from other considerations like temperatures, the content of the molded article can be varied by increasing or decreasing each of the constituent layers.

Yet another variable which affects the content of the molded article is the bonding characteristics of the inner surface of the mold in relation to the cap layer deposited thereon. Increasing or decreasing the frictional characteristics of the inner surface by smoothing or roughening the inner surface will, in turn, affect the amount and rate upon which the cap layer is deposited on the inner surface of the mold.

One primary advantage of the injection molding process of this invention is that an extremely uniform cap layer may be produced. Oftentimes, the cap layer is the most expensive constituent of the molded product. Thus, being able to precisely control the deposition of the cap layer on the inner surface of the mold can greatly reduce the cost of making the molded article and can also enhance the desired characteristics of the molded article. Furthermore, if more than one cap or core layer is required to make the molded article, the injection molding process of this invention also allows for the creation of a composite molded article having layers that can be precisely controlled as they are deposited within the mold.

Although one object of the invention is to provide a molded product with uniform layers, it is within the spirit and scope of this invention to also produce molded articles which may have an outer surface comprising an irregular pattern or an outer surface having a striped appearance by allowing the core material to penetrate the cap material or to otherwise allow the inner core material to make contact with the inner surface of the mold. By the method of injection molding which follows, it is apparent that the materials injected into the mold may be precisely varied to achieve either uniform thicknesses or deliberately formed with breaks or gaps in the constituent layers of the molded article.

Another advantage of the injection molding process of this invention is that the materials used to make the molded product may be introduced into a mold which is at room temperature. In many injection molding processes, it is necessary for the mold to be kept at the melt temperature of the entering materials in order that laminar flow be maintained for the materials filling the mold. By the injection molding process of this invention, it is desirable to provide a mold at a cooler temperature in comparison with the cap material which is injected therein. Therefore, the method of this invention is also more economical in terms of not having to heat the mold and keep it at a constant elevated temperature.

Additional advantages of this invention will become apparent from the description which follows, taken in conjunction with the accompanying drawings.

BEST MODE FOR CARRYING OUT THE INVENTION

Figure 1:
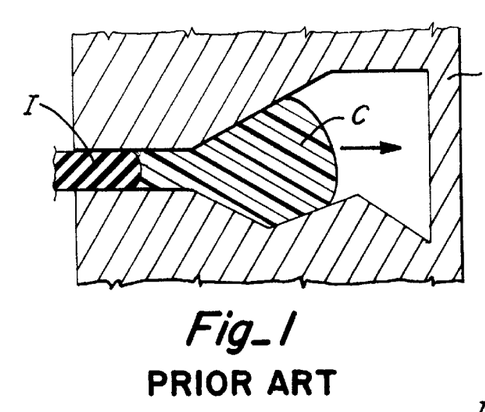
FIG. 1 is a cross-sectional view of a mold being filled with resin material by a common prior art method.
Figure 2:
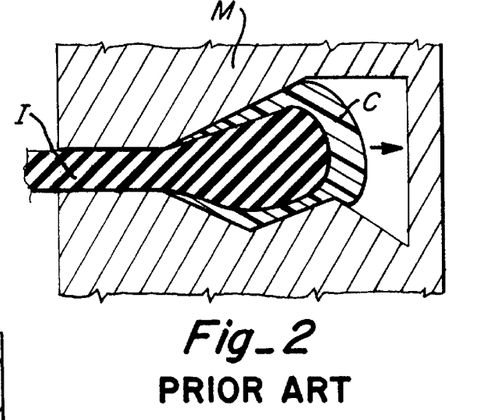
FIG. 2 is a cross-sectional view, as shown in FIG. 1, showing a sequential step in the prior art method.
Figure 3:
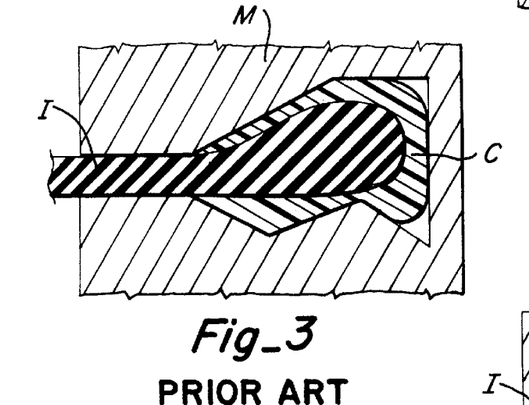
FIG. 3 is cross-sectional view, as shown in FIGS. 1 and 2, showing another sequential step in the prior art method.
Figure 4:
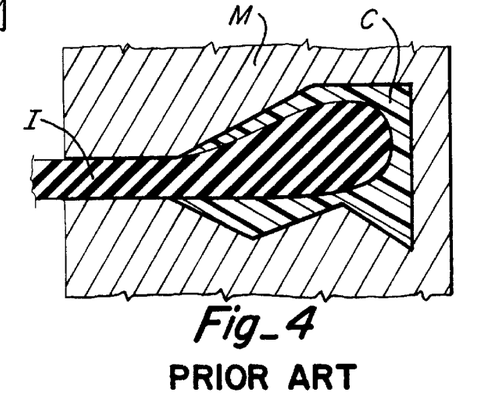
FIG. 4 is a cross-sectional view, as shown in FIGS. 1–3, illustrating another sequential step in the prior art method.

As shown in FIGS. 1–4, one of the most common prior art methods of injection molding is to first introduce cap material C into the mold M followed by the inner core material I which spreads the cap material C along the inner surface S of the mold M. As shown in FIG. 1, the cap material C sequentially precedes the inner core material I into the mold. FIGS. 2–4 illustrate the subsequent entry of the inner core material I into the mold M whereby the cap material C is spread by the inner core material I along the inner surface S of the mold M. The sequential and separate injection of inner core material and cap material can result in a cap material which is irregularly deposited along the inner surfaces of the mold. That is, it is difficult to achieve a cap material C having a uniform thickness or easily controlled thickness by injection according to the prior art method.

Figures 5, 6, 7, 15:
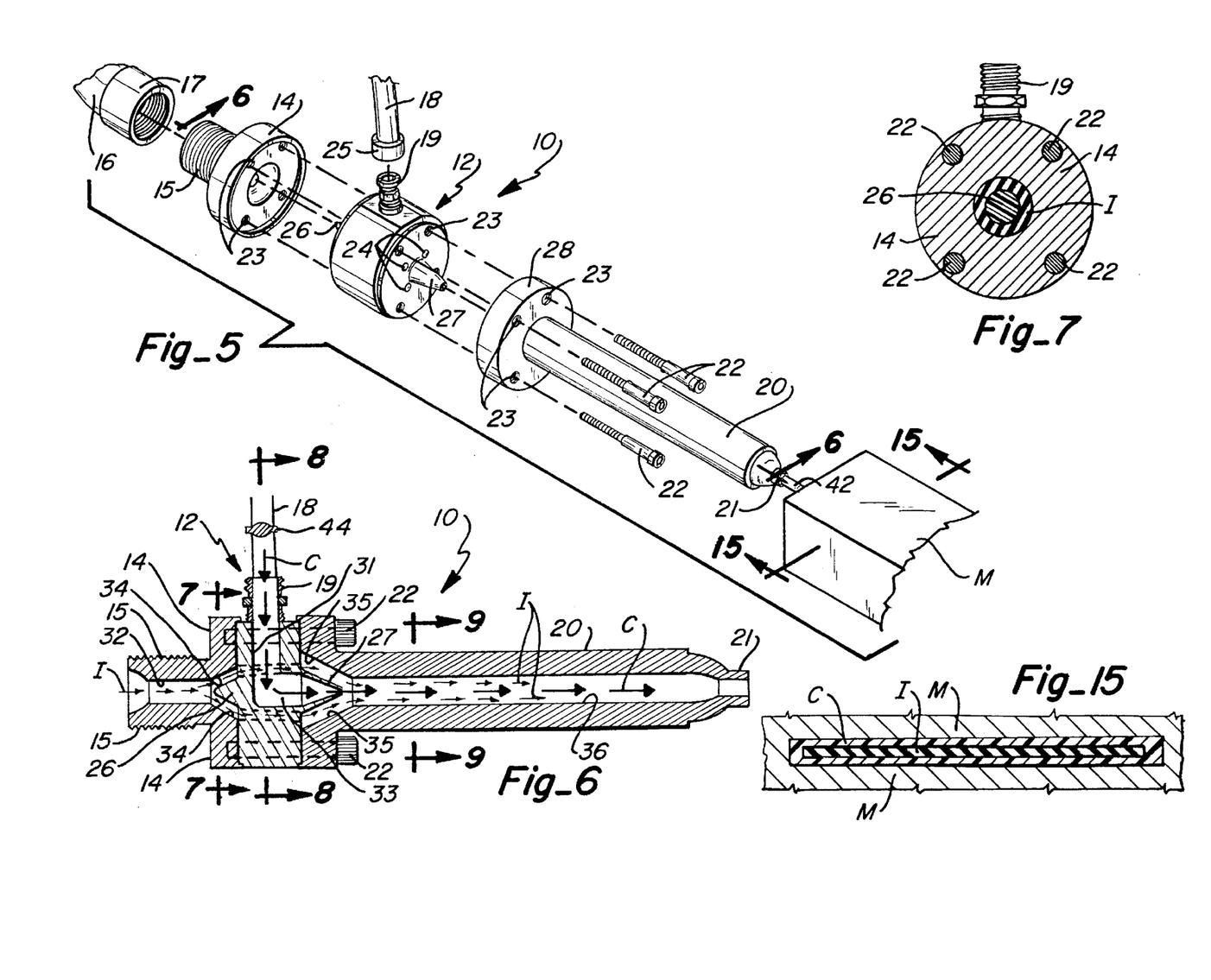
FIG. 5 is an exploded perspective view of an injection device which may be used to provide an annular stream of resin materials into a mold.
FIG. 6 is a vertical section, taken along line 6—6 of FIG. 5, illustrating the interior structural details of the injection device.
FIG. 7 is an enlarged vertical section, taken along line 7—7 of FIG. 6, illustrating the entry of one of the resin materials into the injection device.
FIG. 15 is an enlarged horizontal section, taken along line 15—15 of FIG. 5, illustrating a first molded article within a mold created by the method of this invention, the first molded article having a substantially uniform cap layer.

As shown in FIG. 5, an apparatus which may be used to effect the method of this invention is illustrated as injection device 10. Injection device 10 includes a dispersion head 12 which communicates via injection carrier 20 with hot runner 42 which, in turn, communicates with mold M.

Dispersion head 12 is the structure which creates the annular stream of resin materials which are introduced into the mold by positioning the resin materials in a concentric arrangement before passing through the injection carrier 20. The upstream side of dispersion head 12 attaches to flange 14 which connects upstream to horizontal tube 16. Tube 16 supplies inner core material I into dispersion head 12. Flange 14 may include a threaded end 15 which mates with fitting 17 of tube 16. Lateral tube 18 has a distal fitting 25 which connects to fitting 19 located on dispersion head 12 for providing flow of the cap material C into the dispersion head 12.

Flanged end 28 of injection carrier 20 attaches to the downstream side of dispersion head 12 as by bolts 22 which are routed through bolt holes 23 so as to extend through flanged end 28, dispersion head 12 and flange 14.

Figure 8:
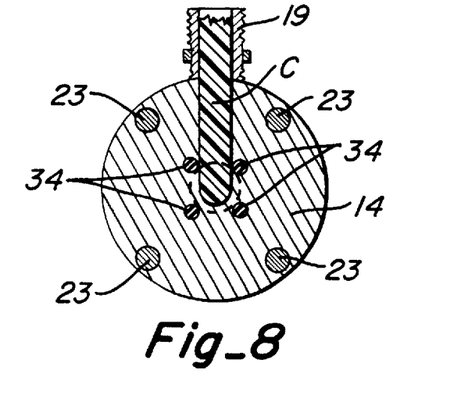
FIG. 8 is an enlarged vertical section, taken along line 8—8 of FIG. 6, illustrating the flow of the resin materials as they pass through the injection device.

The creation of an annular stream of resin materials is best seen in FIGS. 6–9. Inner core material I flows through horizontal tube 16 along interior horizontal passageway 32. The inner core material I next travels through flange 14 along bypass passageways 34. As shown in FIG. 6, upstream conical extension 26 helps to separate the flow of inner core material I into the respective bypass passageways 34. As shown in FIG. 8, four bypass passageways are provided; however, depending upon the type of inner core material used, the number and size of the bypass passageways can be changed to allow proper flow of the inner core material through the passageways. The downstream ends of the bypass passageways 34 are defined by corresponding orifices 24 which each communicate with concentric passageway 35. The downstream side of dispersion head 12 includes downstream conical extension 27 which provides concentric passageway 35 its concentric shape. Cap material C, as shown in FIG. 6, is introduced through lateral tube 18 and travels into lateral passageway 31 which makes a 90° turn in the horizontal direction within cavity 33. Although tube 18 and passageway 31 are illustrated as being vertical, they may be positioned to communicate with the dispersion head at any point about its periphery.

Figure 9:
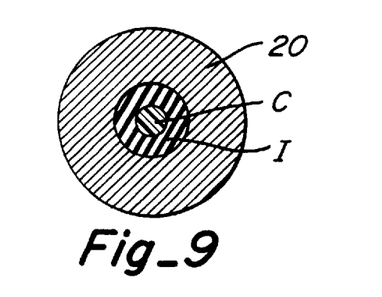
FIG. 9 is an enlarged vertical section, taken along line 9—9 of FIG. 6, illustrating the annular stream of material in a concentric arrangement as the materials pass through the injection carrier portion of the injection device.

The cap material C then continues to travel horizontally into injection passageway 36 wherein the cap material merges with the formed ring of inner core material to create the annular stream. The resulting arrangement of cap and core material is shown in FIG. 9 wherein inner core material I completely surrounds the cap material C in a concentric fashion. The cap and core material travel downstream along injection passageway 36 and through nozzle 21 into hot runner 42. The cap and core material continue to travel in their concentric arrangement through hot runner 42 into the mold $M_1$ as shown in FIGS. 10–14.

Figure 9A:
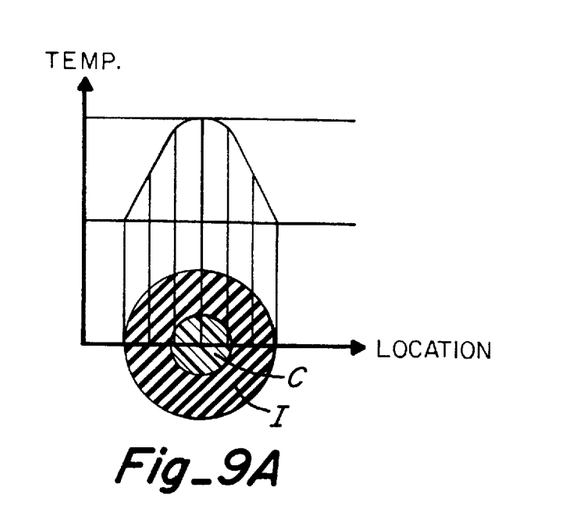
FIG. 9A is a vertical section, as shown in FIG. 9, with a superimposed graph illustrating an example temperature gradient of the resin materials.

As shown in FIG. 9A, a particular temperature gradient is illustrated wherein the cap material C is at a higher temperature than the inner core material I. Furthermore, it can be seen that the temperature of the resin materials continues to decrease as the location of the resin materials approach the exterior surface of the annular stream. Depending upon the flow rate and the type of resin materials used, the temperature gradient can be modified to result in either a decreased or increased flow of each type of resin material in the annular stream.

Figure 10:
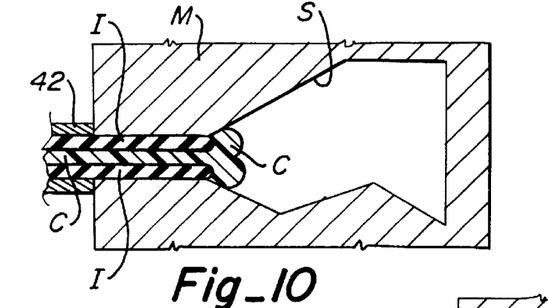
FIG. 10 is a cross-sectional view of a mold being filled by resin materials according to one method of this invention.
Figure 11:
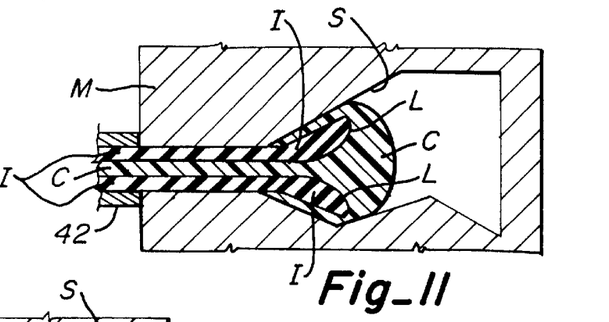
FIG. 11 is a cross-sectional view, as shown in FIG. 10, showing a sequential step in the injection molding process of this invention.

As seen in FIG. 10, the annular stream of resin materials has flowed through hot runner 42 and commences to enter the inner cavity of the mold $M_1$. At this point, the flow of the cap material C first contacts the inner surface S of the mold. As shown sequentially in FIGS. 11–14, the cap material C continues to flow beyond a leading edge L of the inner core material I and wherein the concentric arrangement of the cap and core materials are maintained through a substantial portion of the filling of the cavity of the mold.

Figure 12:
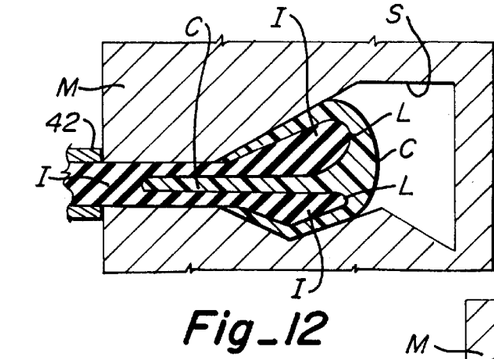
FIG. 12 is another cross-sectional view, as shown in FIGS. 10 and 11, illustrating another sequential step in the injection molding process of this invention.
Figure 13:
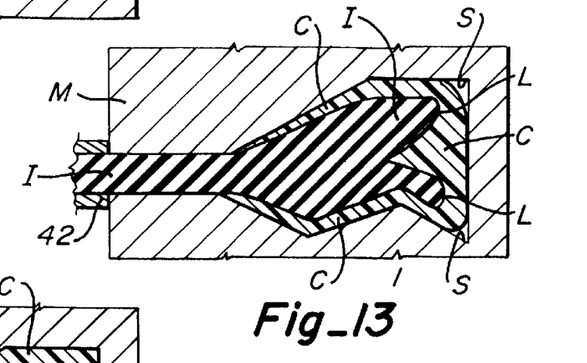
FIG. 13 is a cross-sectional view, as shown in FIGS. 10–12, illustrating another sequential step in the injection molding process of this invention.
Figure 14:
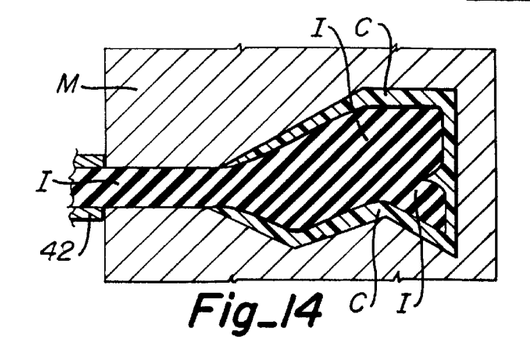
FIG. 14 is a cross-sectional view, as shown in FIGS. 10–13, showing another sequential step in the injection molding process of this invention.

As shown in FIG. 12, the flow of cap material C may be terminated to enable the creation of a substantially uniform cap layer even at the distal end of the mold $M_1$. Alternatively, if it is not critical that the distal end of the molded article have a uniform cap layer, then the cap material may continue to be injected throughout the injection molding process until the mold cavity if filled with resin material. In either circumstance, the remaining portion of the cap material forming the cap layer will be substantially uniform in thickness.

As previously discussed, a number of variables can be manipulated to achieve varying thicknesses of the cap and core layers. Furthermore, it is possible to create molded articles having more than two layers by introducing additional resin materials in a concentric arrangement whereby the flow of each of the additional resin materials can be manipulated to create a composite molded article comprising multiple layers of desired thicknesses. These additional resin materials can be introduced into the mold either in a laminar flow, or may be introduced into the mold cavity in the inside-out flow pattern similar to the cap material C.

Figures 16, 17, 18, 19:
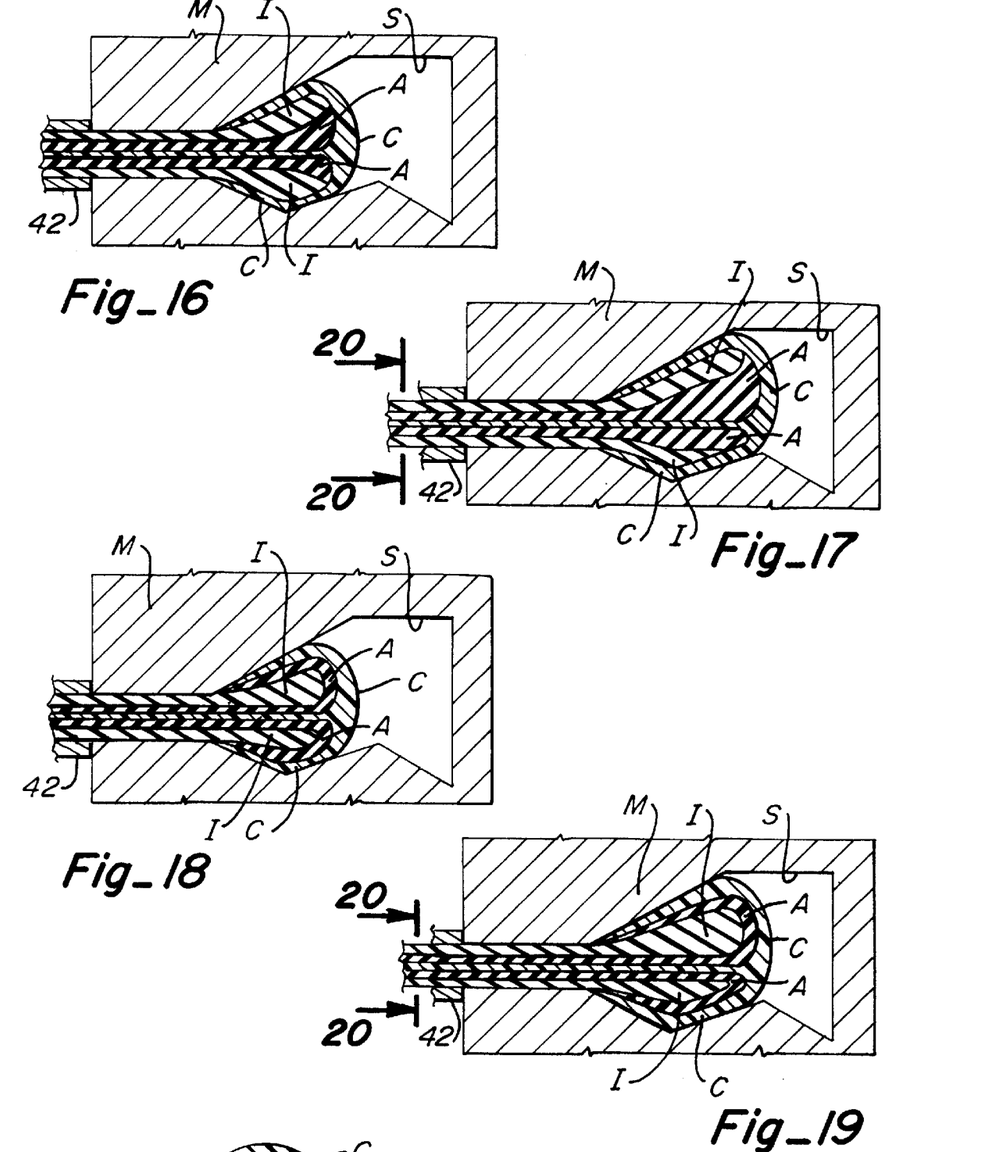
FIG. 16 is cross-sectional view of a mold being filled by a resin material according to another method of this invention wherein the cap material flows in the inside-out manner and the inner core material and intermediate materials flow in a laminar flow pattern.
FIG. 17 is a cross-sectional view, as shown in FIG. 16, showing a sequential step in the injection molding process of this invention.
FIG. 18 is a cross-sectional of a mold being filled by resin materials according to yet another method of this invention wherein the cap material flows in the inside-out manner, the intermediate material flows in the inside-out manner, and the inner core material flows in a substantially laminar flow pattern.
FIG. 19 is a cross-sectional view, as shown in FIG. 18, showing a sequential step in the injection molding process of this invention.

As shown in FIGS. 16 and 17, the introduction of an additional resin material is shown as additional intermediate material A. Accordingly, a molded article will have a triple layered structure which includes an outer cap layer made of cap material C, an inner core material I, and an additional intermediate material A which may be disposed interiorly of core material I, as shown, or may be disposed exteriorly of core material I, but interiorly of cap material C. According to the method shown in FIGS. 16 and 17, both the inner core material I and the additional intermediate material A flow in substantially laminar flow patterns, while only the inner core material I flows in the inside-out manner.

Figure 20:
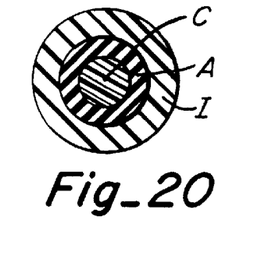
FIG. 20 is an enlarged vertical section, taken along Line 20—20 of FIGS. 17 and 19, illustrating the concentric arrangement of the resin materials prior to entering the mold.

As shown in FIGS. 18 and 19, a molded article having more than two layers can also be produced by introducing an additional intermediate material A into the mold wherein the additional intermediate material A also flows in an inside-out manner similar to the inner core material I. If the additional intermediate material A also flows in the inside-out manner as the inner core material I, then the additional intermediate material A may also have more uniform layer when compared to the inner core material I. Regardless of the method of injection molding illustrated in FIGS. 16–19, the resin materials enter the mold $M_1$ in a concentric arrangement as shown in FIG. 20. By manipulating the variables such as viscosity, temperature, and injection pressure, the methods of injection molding shown in FIGS. 16–19 can be achieved.

Although the production of a molded article having uniform layers is desirable according to one aspect of this invention, it may also be desirable to deliberately create a molded article which has an irregular surface layer. That is, it may be desirable to have a surface layer which is interspersed with one or more materials making up the core layers. One purpose for creating this irregular outer surface may simply be for aesthetic reasons. In other words, a striped or irregular surface pattern may be desirable in some molded articles because the aesthetics of the molded article may be an important manufacturing consideration. A molded article having an irregular surface pattern may be achieved by temporarily interrupting the flow of the cap or core material, or by cyclically varying the pressure at which the materials are introduced into the mold. As shown in FIG. 6, one way in which to vary the flow of the cap material would be by placing a valve member 44 in line with lateral tube 18. Accordingly, a controller could operate to open, close, or partially close the valve member 44 at desired times to inhibit the flow of cap material therethrough. The resulting deposition of cap or core material on the inner surface of the mold would be reflective of the decreased flow of cap material normally comprising the entire outer surface of the molded article. For example, reducing the flow rate of the cap material through the injection device over a selected period of time could result in the core material overtaking the cap material at a specific location within the mold and thus depositing some finite amount of core material on the inner surface of the mold. Then, the core material could be reintroduced into the mold at an increased rate to enable the cap material to again be deposited on the inner surface of the mold as prior to the controlled reduction of the cap material.

Figure 21:
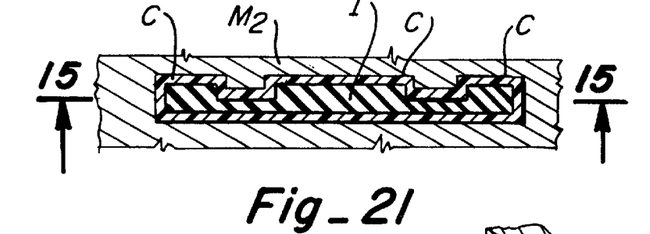
FIG. 21 is an enlarged fragmentary horizontal section, taken along line 15—15 of FIG. 5, illustrating a second molded article within a mold created by the method of this invention, the second molded article having a substantially uniform cap layer and a figure-eight shaped recess.
Figure 22:
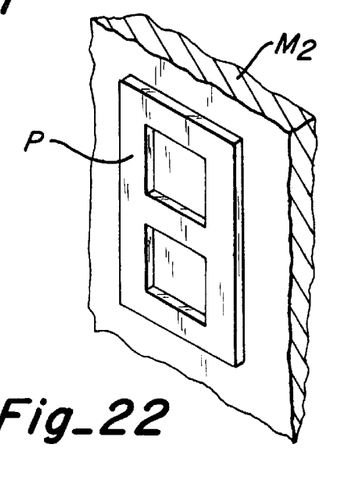
FIG. 22 is a fragmentary interior perspective view of the mold of FIG. 21, illustrating a portion of the mold which creates a recessed figure-eight shape in the second molded article.
Figure 23:
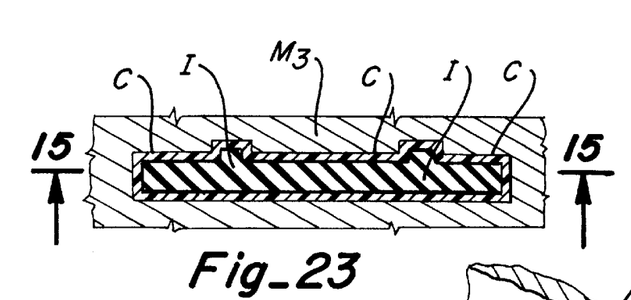
FIG. 23 is an enlarged fragmentary horizontal section, taken along line 15—15 of FIG. 5, illustrating a third molded article within a mold created by the method of this invention, the third molded article having a substantially uniform cap layer and a raised or protruding figure-eight shape.
Figure 25:
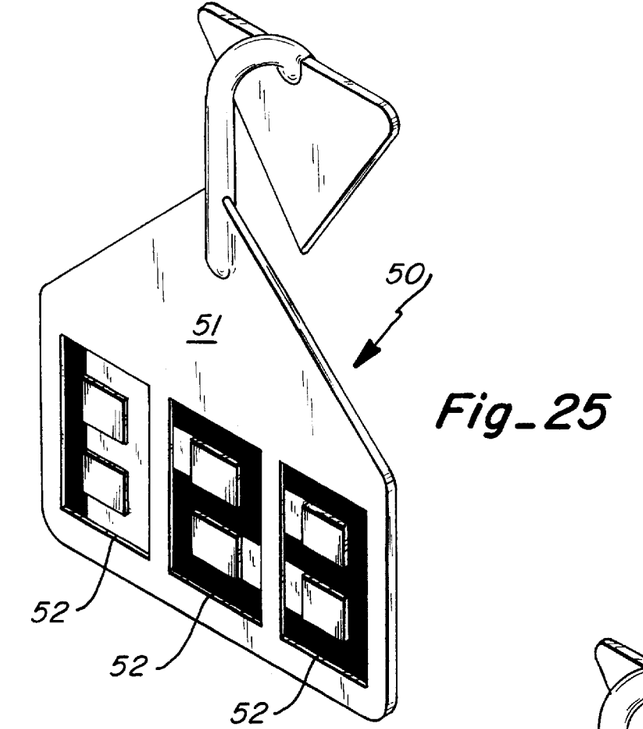
FIG. 25 is a perspective view of the second molded article illustrating three recessed figure-eight shapes formed by the mold of FIG. 21.

As illustrated in FIGS. 21 and 23, a substantially uniform cap layer can be achieved even for those molded articles which may have particularly irregular outer surfaces. As shown in FIG. 25, a molded article 50, formed from mold $M_2$ in FIG. 21, may include a plurality of recesses 52 corresponding to the plurality of projections formed in the mold $M_2$. As shown in FIG. 21, the cap layer C is substantially uniform throughout the body of the molded article. Accordingly, the inner core material I fills those gaps between the cap material C. FIG. 22 better illustrates the projecting portion P of the mold $M_2$ which creates the recesses 52 in the molded article 50.

Figure 24:
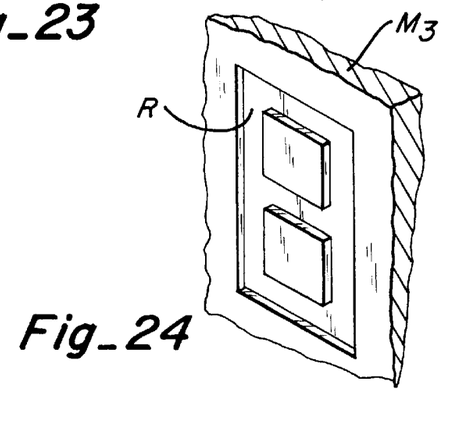
FIG. 24 is a fragmentary interior perspective view of the mold of FIG. 23 illustrating a portion of the mold which creates a protruding figure-eight shape in the third molded article.
Figure 26:
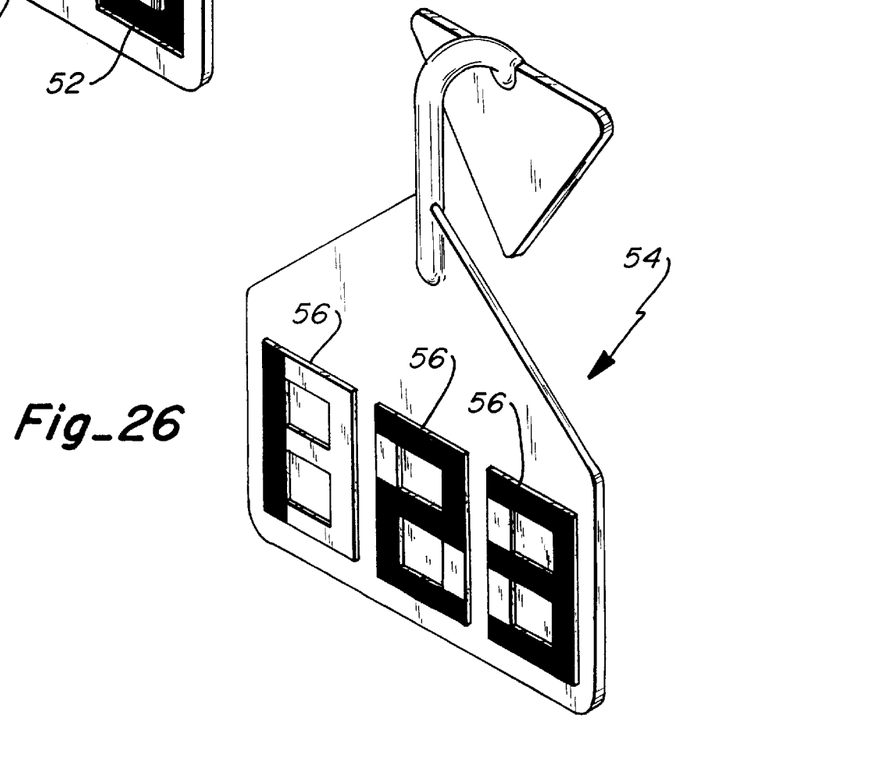
FIG. 26 is a perspective view of the third molded article illustrating three raised figure-eight shapes formed by the mold illustrated in FIG. 23.

As illustrated in FIGS. 23 and 26, instead of a molded article having a recessed outer surface, a molded article 54 may have protruding portions 56 corresponding to recesses formed in mold M₃. As shown in FIG. 24, mold M₃ includes a plurality of recesses R, in the shape of a figure eight pattern, to produce the protrusions 56 on the molded article 54. As with the molded article illustrated in FIG. 21, the molded article in FIG. 23 still maintains a substantially uniform cap layer C with the inner core material I filling those gaps between the cap material.

The molded article 50 is shown in the form of a livestock tag wherein the recesses 52 enable a person to create a desired set of numbers or letters for identification purposes on the tag. For example, the sequential numbers 1, 2 and 3 may be easily highlighted or emphasized by utilizing the channels as guides for a marker or the like. As shown in FIG. 26, the sequential numbers 1, 2 and 3, may be highlighted on the protruding portions 56 of article 54 by a marker. Alternatively, a grinder could be used to grind away the cap layer thus exposing the core layer which may be of a different color or texture than the cap layer. Thus, another advantage of a uniform cap layer is the provision of a desired set of numbers or letters on a molded article simply by grinding away the cap layer at the appropriate locations within the recesses 52 or on the protrusions 56. Instead of using a marker or grinder, the desired set of numbers or letters could be highlighted or emphasized by the use of a hot stamp which melts and discolors the cap material along the recessed portions 52 or protruding portions 56.

One advantage of producing indicia on an article such as the livestock tags illustrated in FIGS. 25 and 26 is that the visual identification of livestock is made easier from a far distance due to the uniform block style of letters or numbers formed. Furthermore, the recesses 52 are particularly advantageous in that the external surface 51 of the tag is often exposed to contact by the ear or hide of the animal which may wear away the surface 51 over a period of time. The recessed indicia is therefore not prone to also being worn away.

By introducing the resin materials in an annular stream or concentric arrangement, a more uniform cap layer and/or intermediate layer may be achieved thus preventing the waste of materials. Such an annular stream also results in the inner core material placing a more even and controllable pressure along each segment of the cap material and/or intermediate material which are deposited on or adjacent to the inner surface of the mold. Additionally, greater flexibility in making molded composite articles is achieved by having the ability to manipulate a number of variables which directly affect the amount of resin materials which are introduced into the mold cavity.

Since the mold may be kept at room temperature, the method of this invention is simpler than many prior art methods which require the mold temperature to be maintained at a specific elevated temperature during the injection molding process.

This invention has been described in detail with reference to particular embodiments thereof, but it will be understood that various other modifications can be effected within the spirit and scope of this invention.

What is claimed is:

1. A method of creating indicia on a multi-layered molded article, said method comprising the steps of:

providing a mold of a desired shape including a recessed portion;

arranging at least two resins in a concentric arrangement;

simultaneously injecting the at least two resins in the concentric arrangement into the mold;

maintaining the concentric arrangement of the two resins as they are simultaneously injected and flow into the mold;

advancing the flow of an innermost resin in the concentric arrangement of the at least two resins by an outer resin in the concentric arrangement of the at least two resins which places an even and controllable force on the innermost resin;

creating a substantially uniform cap layer from the innermost resin as the at least two resins are injected into the mold;

creating at least one core layer from the outer resin as the at least two resins are injected into the mold;

forming the molded article from the at least two resins injected into the mold, the molded article including a protruding portion corresponding to the recessed portion of the mold; and creating indicia on the protruding portion.

2. A method of creating indicia on a multi-layered molded article, said method comprising the steps of:

providing a mold of a desired shape including a protruding portion;

arranging at least two resins in a concentric arrangement;

simultaneously injecting the at least two resins in the concentric arrangement into the mold;

maintaining the concentric arrangement of the two resins as they are simultaneously injected and flow into the mold;

advancing the flow of an innermost resin in the concentric arrangement of the at least two resins by an outer resin in the concentric arrangement of the at least two resins which places an even and controllable force on the innermost resin;

creating a substantially uniform cap layer from the innermost resin as the at least two resins are injected into the mold;

creating at least one core layer from the outer resin as the at least two resins are injected into the mold;

forming the molded article from the at least two resins injected into the mold, the molded article including a recessed portion corresponding to the protruding portion of the mold; and creating indicia on the recessed portion.

3. A method, as claimed in claims 1 or 2 wherein said creating indicia step is achieved by printing.

4. A method, as claimed in claims 1 or 2, wherein said creating indicia step is achieved by hot stamping.

5. A method, as claimed in claims 1 or 2 wherein said creating indicia step is achieved by grinding the cap layer to expose the at least one core layer.

* * * * *